(12) United States Patent
Huang et al.

(10) Patent No.: US 8,244,313 B2
(45) Date of Patent: Aug. 14, 2012

(54) METHOD AND ELECTRONIC DEVICE CAPABLE OF SAVING POWER

(75) Inventors: Pin-Chun Huang, Taoyuan (TW); Mien-Chih Chen, Taoyuan (TW)

(73) Assignee: Foxconn Communication Technology Corp., Taoyuan County (TW)

( * ) Notice: Subject to any disclaimer, the term of this patent is extended or adjusted under 35 U.S.C. 154(b) by 346 days.

(21) Appl. No.: 12/551,685

(22) Filed: Sep. 1, 2009

(65) Prior Publication Data

US 2010/0248794 A1 Sep. 30, 2010

(30) Foreign Application Priority Data

Mar. 25, 2009 (CN) .......................... 2009 1 0301129

(51) Int. Cl.
*H04B 1/38* (2006.01)

(52) U.S. Cl. .... 455/574; 455/572; 455/3.06; 455/127.5; 381/74

(58) Field of Classification Search .................. 455/572, 455/556.1, 2.01, 414.1, 3.06, 418, 420, 425, 455/41.2, 67.11, 552.1, 574, 13.4, 9; 381/58, 381/120; 348/570, E07.001, 738, 71.3, 730; 713/320, 321; 710/14
See application file for complete search history.

(56) References Cited

U.S. PATENT DOCUMENTS

| 6,119,239 | A | | 9/2000 | Fujii | |
|---|---|---|---|---|---|
| 2006/0233388 | A1 | * | 10/2006 | Liow et al. | 381/74 |
| 2007/0220587 | A1 | * | 9/2007 | Loyer | 726/1 |
| 2007/0229717 | A1 | * | 10/2007 | Tseng et al. | 348/738 |
| 2008/0140871 | A1 | * | 6/2008 | Park et al. | 710/14 |
| 2008/0231449 | A1 | * | 9/2008 | Moshfeghi | 340/572.1 |
| 2008/0298606 | A1 | * | 12/2008 | Johnson et al. | 381/74 |
| 2008/0307240 | A1 | * | 12/2008 | Dahan et al. | 713/320 |
| 2009/0110206 | A1 | * | 4/2009 | Haggis et al. | 381/58 |
| 2009/0138736 | A1 | * | 5/2009 | Chin | 713/320 |
| 2009/0197640 | A1 | * | 8/2009 | Fa et al. | 455/556.1 |
| 2010/0182507 | A1 | * | 7/2010 | Haggis et al. | 348/570 |
| 2010/0231808 | A1 | * | 9/2010 | Huang et al. | 348/730 |
| 2010/0240297 | A1 | * | 9/2010 | Jones et al. | 455/2.01 |

FOREIGN PATENT DOCUMENTS

CN 101282431 A 10/2008

* cited by examiner

*Primary Examiner* — Tan Trinh
(74) *Attorney, Agent, or Firm* — Altis Law Group, Inc.

(57) ABSTRACT

A method and an electronic device capable of saving power are disclosed. The electronic device includes a power save system, a media player application and an audio interface. The audio interface includes an audio driver module, and an audio processor. The power save system includes a monitor unit, and a control unit. The monitor unit monitors the current mode of the media player application. If the media player application is in the mute mode, the control unit transmits a power-save signal to switch off the audio processor to save power of the electronic device.

12 Claims, 3 Drawing Sheets

METHOD AND ELECTRONIC DEVICE CAPABLE OF SAVING POWER

BACKGROUND

1. Technical Field

The present disclosure relates to a method and an electronic device capable of saving power.

2. Description of Related Art

Electronic devices, such as mobile phones, personal digital assistants (PDA), handheld game consoles, digital still cameras (DSC) and handheld computers frequently employ media player applications playing audio streams via audio interfaces installed therein.

Users may adjust the music volume of a media player application according to different situations. For example, a user may turn down the volume until the player software is in a mute mode. However, because audio interfaces of the electronic device may be unable to sense that the electronic device is in a mute mode, the audio streams are still transmitted and displayed by the audio interfaces. Thus, the audio interfaces still consume power of the electronic device even if the player software is in the mute mode.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or assembly. One or more software instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either software and/or hardware module and may be stored in any type of computer-readable medium or other computer storage device.

Figure 1:
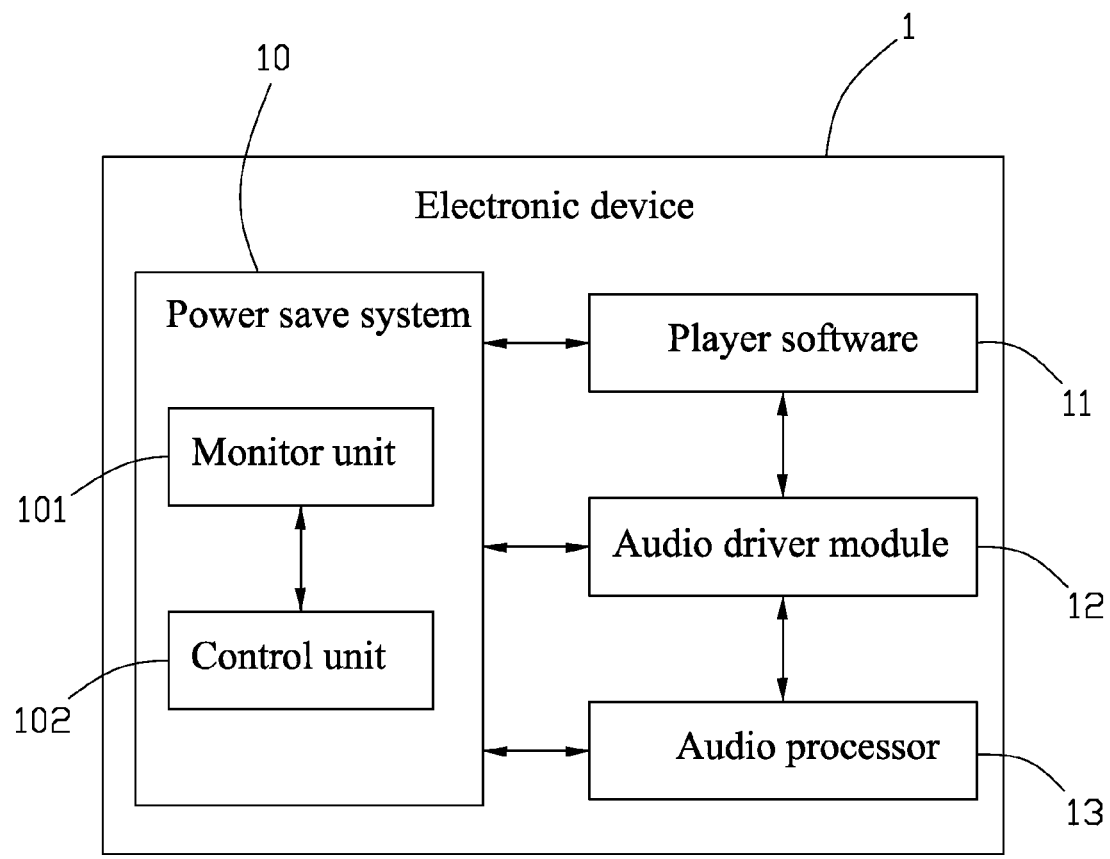
FIG. 1 is a block diagram of one embodiment of an electronic device capable of saving power.

FIG. 1 is a block diagram of one embodiment of an electronic device capable of saving power. The electronic device 1 includes a power save system 10, a media player application 11 and an audio interface 12. The audio interface 12 includes an audio driver module 121, and an audio processor 122. The electronic device 1 may play audio by operating the media player application 11 to drive the audio interface 12 to output audio. In the embodiment, the electronic device 1 is a mobile phone. In other embodiments, the electronic device 1 may be a personal digital assistant (PDA), a handheld game console, a digital still camera (DSC) or a handheld computer.

The electronic device 1 is generally controlled and coordinated by operating system software, such as UNIX, Linux, Windows, Mac OS an embedded operating system, or any other compatible operating systems. In other embodiments, the electronic device 1 may be controlled by a proprietary operating system. Conventional operating systems control and schedule computer processes for execution, perform memory management, provide file system, networking, and I/O services, and provide a user interface, such as a graphical user interface (GUI), among other things.

The media player application 11 reads audio data from digital media such as CD, DVD, Blu-ray Disc, etc, or audio formats, such as MP3, AAC, AC-3, WMV, WMA, or other formats, and converts the audio data into audio streams. Media player application 11 may be operated in a mute mode or a non-mute mode. The audio driver module 121 receives the audio streams from the media player application 11 and renders the audio streams. Rendering the audio streams is a process of compressing many audio streams into fewer audio streams, such as converting 5.1-channel surround sound into 2-channel stereo or converting 2-channel stereo into mono sound. The audio driver module 121 transmits the rendered stream to the audio processor 122. The audio processor 122 converts the rendered audio stream to an audio if the media player application 11 is in the non-mute mode.

The power save system 10 includes a monitor unit 101, and a control unit 102. The monitor unit 101 monitors the current mode of the media player application 11. After monitoring that the media player application 11 is in the mute mode or in the non-mute mode, the monitor unit 101 transmits a mode signal indicative of the mode of the media player application 11 to the control unit 102.

If the media player application 11 is in the mute mode, the control unit 102 transmits a power-save signal to switch off the audio processor 122 and instructs the audio driver module 121 to cancel the rendered audio stream. Thus, the audio processor 122 consumes no power and the audio driver module stops transmitting the rendered audio stream to the audio processor 122 so as to save the power of the electronic device 1. If the media player application 11 is in the non-mute mode, the control unit 102 transmits an operational signal to switch on the audio processor 122 and instructs the audio driver module 121 to transmit the rendered audio stream to the audio processor 122. Upon receiving the rendered audio stream, the audio processor 122 coverts the rendered audio stream to the audio.

Figure 2:
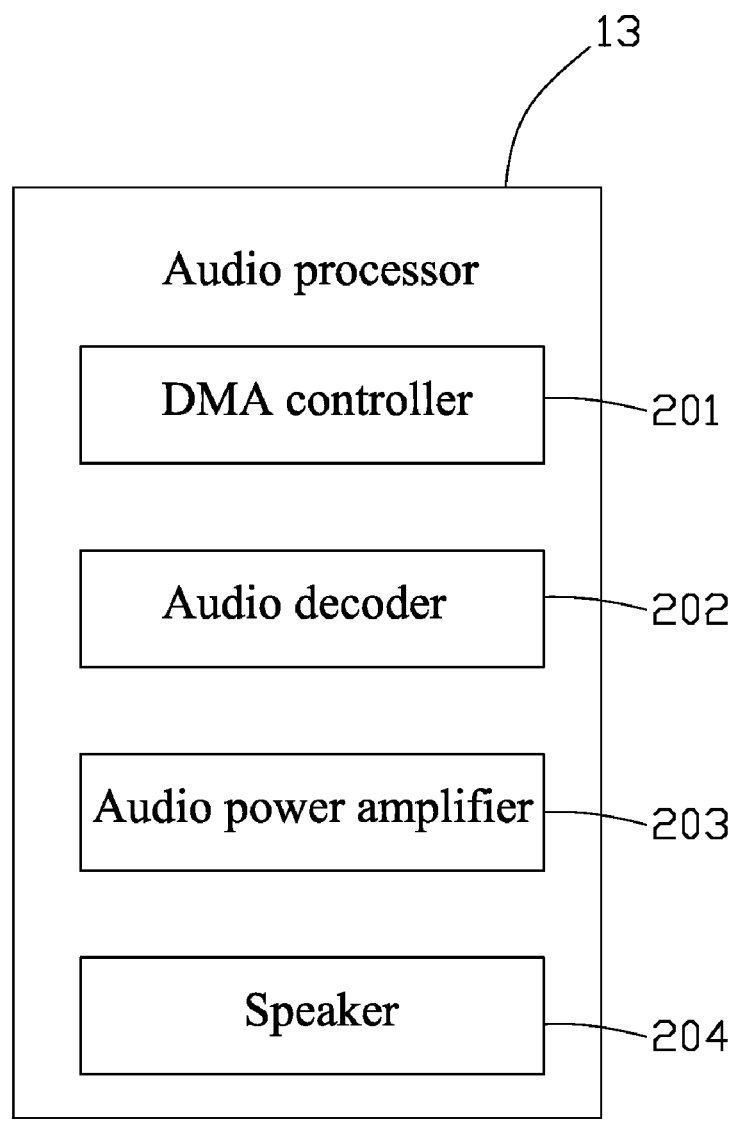
FIG. 2 is a block diagram of one embodiment of an audio processor in FIG. 1.

FIG. 2 is a block diagram of one embodiment of the audio processor 122 of FIG. 1. The audio processor 122 is configured for converting the rendered audio stream to the audio. The audio processor 122 may include a DMA (direct memory access) controller 201, an audio decoder 202, an audio power amplifier 203 and a speaker 204. The DMA controller 201 transmits the rendered audio stream to the audio decoder 202. The audio decoder 202 decodes and converts the rendered audio stream sent from the DMA controller 201 to an analog audio. The audio decoder 202 transmits the analog audio to the audio power amplifier 203. The audio power amplifier 203 amplifies the power of the analog audio and transmits the amplified analog audio to the speaker 204. The speaker 204, such as an earphone, converts the amplified analog audio to the audio.

Figure 3:
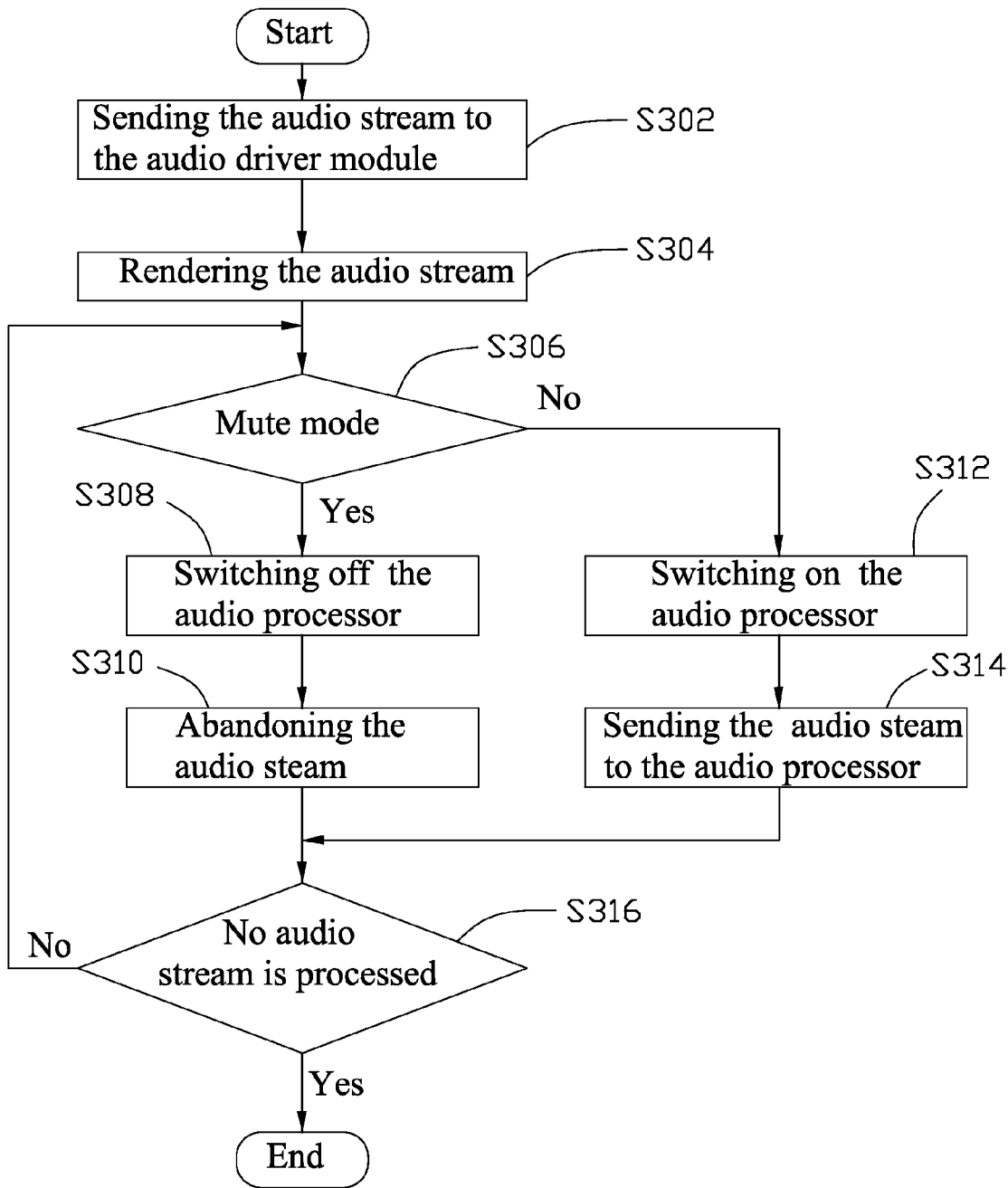
FIG. 3 is a flowchart of illustrating one embodiment of a method for saving power for the electronic device.

FIG. 3 is a flowchart of illustrating one embodiment of a method for saving power for the electronic device 1. The method is employed to switch off the audio processor 122 when the media player application 11 operates in the mute mode so as to save the power consumed by the audio interface 12. Depending on the embodiment, additional blocks in the flow of FIG. 3 may be added, others removed, and the ordering of the blocks may be changed.

After the media player application 11 is executed, in block S302, the media player application 11 transmits an activation signal to activate the monitor unit 101 and transmits the audio stream to the audio driver module 121.

In block S304, the audio driver module 121 renders the audio stream.

In block S306, the monitor unit 101 monitors whether the media player application 11 is in the mute mode or in the non-mute mode. If the media player application 11 is in the mute mode, in block S308, the control unit 102 transmits a power-save signal to switch off the audio processor 122. In block S310, the power-save signal is sent to the audio driver module 121 to instruct the audio driver module 121 to cancel the audio stream.

In block S316, If the monitor unit 101 monitors that the media player application 11 has stopped playing the audio stream, the process ends. If the monitor unit 101 detects that the media player application 11 has additional audio stream to be processed, the process goes back to block S306 to repeat the above-mentioned processing.

In block S306, if the media player application 11 is in the non-mute mode, the process goes to block S312. In block S312, the control unit 102 transmits the operational signal to switch on the audio processor 122. In block S314, the control unit 102 also transmits the operational signal to instruct the audio driver module 121 to transmit the rendered audio stream to the audio processor 122. The process then goes to block S316 to determine whether additional audio stream has to be processed.

In the electronic device of the present disclosure, the audio processor is switched off by the control unit when the media player application is in the mute mode. The power consumption of the electronic device is thus effectively reduced.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for saving power in an electronic device, the electronic device comprising an audio processor, an audio driver module, and a media player application having mute and non-mute modes, the method comprising:
    transmitting audio streams to the audio driver module by the media player application;
    monitoring a current mode of the media player application;
    transmitting a mode signal indicative of the current mode of the media player application;
    transmitting a power-save signal to the audio processor and instructing the audio driver module to cancel the audio streams in response to monitoring that the media player application is in the mute mode; and
    switching off the audio processor according to the power-save signal.

2. The method of claim 1, further comprising:
    switching on the audio processor upon monitoring the media player application is in the non-mute mode.

3. The method of claim 1, further comprising:
    rendering the audio streams by the audio driver module.

4. The method of claim 1, further comprising:
    instructing the audio driver module to transmit the rendered audio streams to the audio processor upon monitoring that the media player applications is in the non-mute mode.

5. An electronic device capable of saving power, the electronic device comprising:
    an audio driver module;
    a media player application having mute and non-mute modes, and to transmit audio streams to the audio driver module;
    an audio processor;
    a monitor unit to monitor a current mode of the media player application, and to transmit a mode signal indicative of the current mode of the media player application; and
    a control unit to transmit a power-save signal to switch off the audio processor and to instruct the audio driver module to cancel the audio streams when the media player application is in the mute mode.

6. The electronic device of claim 5, wherein, upon monitoring that the media player application is in the non-mute mode, the control unit transmits an operational signal to the audio processor to switch on the audio processor.

7. The electronic device of claim 6, wherein the electronic device further comprises an audio driver module to render audio streams from the media player application.

8. The electronic device of claim 5, wherein, upon monitoring that the media player application is in the non-mute mode, the control unit transmits the operational signal to the audio driver module to instruct the audio driver module to transmit the rendered audio streams to the audio processor.

9. A storage medium having stored thereon instructions that, when executed by a processor, causing the processor to perform a method for saving power in an electronic device, the electronic device comprising an audio processor and an audio driver module, and a media player application having mute and non-mute modes, wherein the method comprises:
    transmitting audio streams to the audio driver module by the media player application;
    monitor the current mode of the media player application;
    transmitting a mode signal indicative of the current mode of the media player application;
    transmitting a power-save signal to the audio processor and instructing the audio driver module to cancel the audio streams in response to monitoring that the media player application is in the mute mode; and
    switch off the audio processor according to the power-save signal.

10. The storage medium of claim 9, wherein the method further comprises,
    switch on the audio processor upon monitoring that the media player application is in non-mute mode.

11. The storage medium of claim 9, wherein the method further comprises:
    render the audio streams by the audio driver module.

12. The storage medium of claim 9, wherein the method further comprises:
    instruct the audio driver module to transmit the rendered audio streams to the audio processor upon monitoring the media player application is in the non-mute mode.

* * * * *